United States Patent [19]

Kloehn

[11] Patent Number: 5,190,076

[45] Date of Patent: Mar. 2, 1993

[54] LOW ENERGY THREE WAY VALVE

[76] Inventor: Michael F. Kloehn, 20805 Chateau Ave., Yorbalinda, Calif. 92686

[21] Appl. No.: 787,916

[22] Filed: Nov. 7, 1991

[51] Int. Cl.⁵ .............................................. F16K 11/02
[52] U.S. Cl. .............................. 137/625.5; 137/625.27
[58] Field of Search ................ 137/625.27, 625.5, 863

[56] References Cited

U.S. PATENT DOCUMENTS

| | | | |
|---|---|---|---|
| 2,934,090 | 4/1960 | Kenann | 137/625.5 |
| 4,237,931 | 12/1980 | Rafaely | 137/625.5 |
| 5,007,458 | 4/1991 | Marcus | 137/625.5 |

Primary Examiner—Robert G. Nilson
Attorney, Agent, or Firm—Donald D. Mon

[57] ABSTRACT

A low energy valve having a body with two opposed faces and a central passage opening onto them. A circular seat is formed on each face. The passage opens onto both faces inside the seals. A respective port opens onto each face outside of the seals. A sealing diaphragm is spaced from each seat. A push rod is interposed between the diaphragms. A bias force exerted on one diaphragm closes its respective seat and through the push rod opening the other. An actuator can reverse this setting.

9 Claims, 1 Drawing Sheet

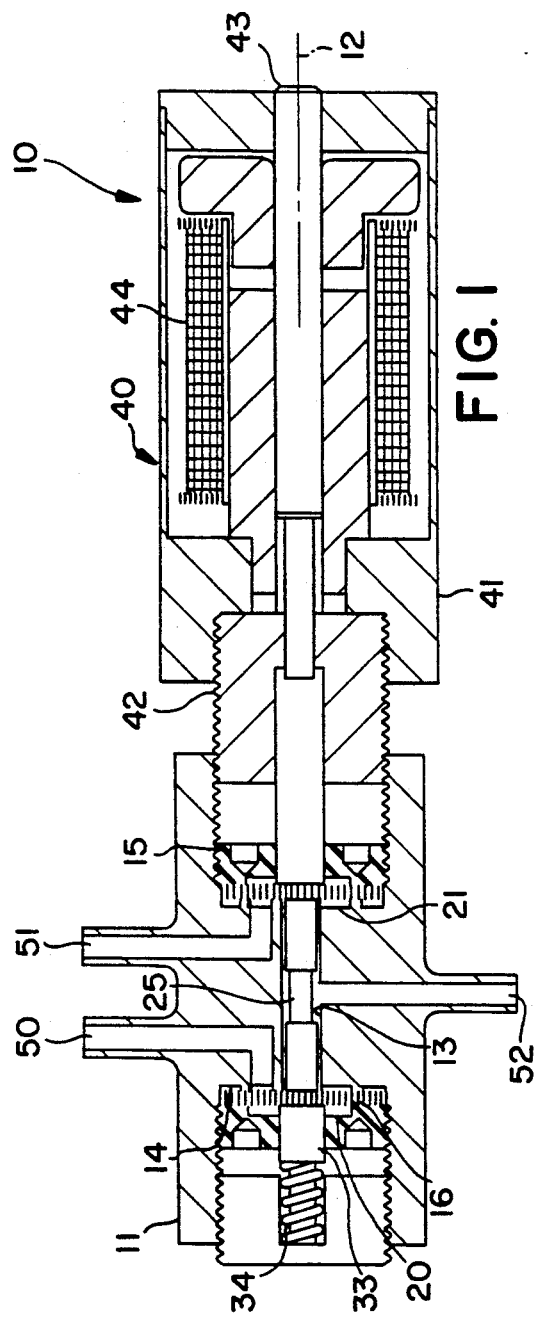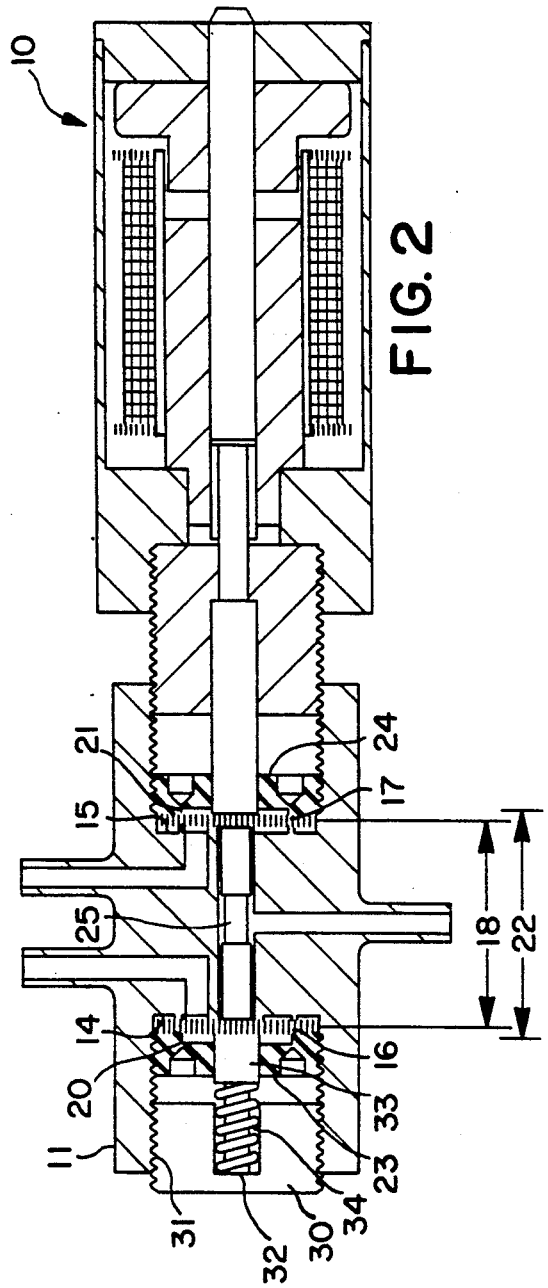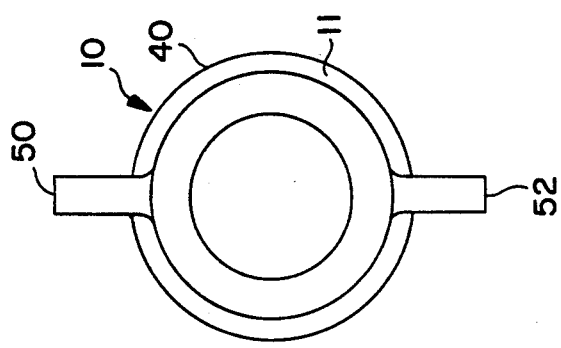

LOW ENERGY THREE WAY VALVE

FIELD OF THE INVENTION

This invention relates to valves for controlling the flow of fluids, and especially to a three way valve which can operate reliably on very little energy.

BACKGROUND OF THE INVENTION

There is a widespread demand for relatively small valves which can operate reliably and quickly, using very little energy for actuation, and capable of lasting for many millions of cycles. While there are applications for such valves in many fields, there are special requirements in medical laboratories and in their analytical equipment. In these applications valves are opened frequently to pass various solutions, sometimes from two different sources to one destination, or sometimes from one source to one or the other of two destinations. Examples of liquids to be controlled are water, saline solution, and reagent solutions.

Often the quantity to be passed is quite small, so that a quick acting valve is necessary. Clearly it is desirable to keep the energy consumption and the heat produced by the valves to the lowest practical level. A valve according to this invention can operate on as little as 1.5 watts of power, and can open or close in 5 milliseconds.

Also, some instruments use many of these valves. It is very expensive and disruptive to find and replace individual valves which have failed in such instrumentation. Accordingly service life is of serious importance. A valve according to this invention can readily be made to operate for at least 20 million cycles without repair. Furthermore, the valve can be made so economically that replacement of the valve is a viable alternative to repair.

BRIEF DESCRIPTION OF THE INVENTION

A quick acting valve having a body with a pair of opposite faces. Each face carries a circular seat, these seats being separated by an axial reference spacing. A pair of diaphragms are mounted to the body. Each has a sealing surface facing a respective seat. The sealing surfaces are spaced apart by a control spacing which is larger than the reference spacing. An axially-extending push rod has a length at least equal to the control spacing.

Force bias means presses against one of the diaphragms to tend to seat it on its respective seat and to unseat the other. Actuator means is provided to reverse this setting.

A port opens onto each face outside of the respective seat, and a central passage opens onto each face inside the seats. A third port opens into the central passage.

This arrangement enables the valve setting to be changed as a function of moving the pushrod against the force bias means, or of permitting the force bias means to exert the control.

The above invention will be fully understood from the following detailed description and the accompanying drawings, in which:

BRIEF DESCRIPTION OF THE DRAWINGS

FIG. 1 is an axial cross-section of the presently-preferred embodiment of the invention in its actuated condition;

FIG. 2 is a view similar to FIG. 1 showing the valve in its normal condition; and FIG. 3 is a left hand view of FIG. 1.

DETAILED DESCRIPTION OF THE DRAWINGS

A valve 10 according to the invention is shown in FIG. 1 It has a body 11 with a central axis 12. An axial central passage 13 extends through the body and opens onto a first face 14 and a second face 15. These faces respectively include a first valve seat 16 and a second valve seat 17. The valve seats are ring-shaped, parallel to each other, and normal to the central axis.

The seats are raised relative to their respective face, and passage 13 opens within them. These seats are axially spaced apart from one another by a reference spacing 18.

A first diaphragm 20 and a second diaphragm 21 are mounted to the body so as to close the body at their respective ends. These diaphragms are flexible and elastic, and are adapted to have their sealing surfaces pressed against the respective valve seat, to act as seals to open or to close the central passage at the valve seats.

The diaphragms are mounted so that without any bias or actuation their sealing surfaces are spaced apart by a control spacing 22. Control spacing 22 is larger than reference spacing 18. Retainers 23 and 24 hold them in place.

A push rod 25 is slidably placed in the central passage. Its axial length is greater than that of reference spacing 18, usually as long as the control spacing so that it can always be in contact with both diaphragms. When the diaphragms are in their relaxed condition, without bias, they will both be out of contact with their respective valve seat and preferably in contact with the push rod.

A plug 30 is threaded into a threaded opening 31 in the body. It carries a force bias means 32 comprising a plunger 33 and a bias spring 84. This plunger bears against the first diaphragm, and tends to close the central passage at the first valve seat, and through the push rod to open the passage through the second seat. Thus this valve is normally open at the second seat (FIG. 2).

Actuator means 40 is schematically shown, and is exemplary of a wide variety of actuators which can be used to move the diaphragms and push rod to open the passage at the first seat and close it at the second seat. Actuator 40 has a body 41 threaded to an extension of body 11. A plunger 42 in body 41 abuts the magnetic armature 43 of a solenoid winding 44. When energized, winding 44 will move the armature and plunger 42 to press against the second diaphragm to close the second valve seat. In turn, the push rod will press against the first diaphragm and through it against the bias means to open the valve seat at the first seat. As a consequence, the opening and closing of the valve seats will have been reversed.

A first port 50 through the body opens on the first face of the first valve seat. A second port 51 through the body opens on the second face outside of the second valve seat. A third port 52 through the body opens into the central passage.

The valve is adjusted by turning plug 30 in its thread. When the adjustment is completed, it is good practice to hold it by applying a sealant or adhesive such as "LOC-TITE". Now it will be seen that the setting of this valve, which is normally closed at the first valve seat and open at the second valve seat, can be reversed by energizing the actuator means.

Very quick and exquisitely small valve movements can be attained with remarkable repetivity relative to the volume of fluids which it passes. The valve can be used as a three way valve in either direction, or one of the first and second ports can be plugged and the valve then can be used as a simple off/on valve.

The useful life before repair of this valve is limited only by the diaphragms. Diaphragms made of an elastometer with a durometer reading of about 40.0, have given remarkably long life. A thickness of about 0.175 inches for a ⅜ inch diaphragm appears to provide good service. The materials of construction of the valve can be selected for resistance to various reagents and solutions.

Elastomers for the diaphragms are only one example of useful materials. Suitably thin metal diaphragms are also useful, for example stainless steel diaphragms. The body can be made of clear material to allow for visual inspection. There is no tendency in this valve to form air bubbles.

A wide range of actuator types can be used. Pneumatic and hydraulic assemblies are examples in addition to electrical solenoids. The valve could, of course, be actuated by hand. Then an actuator would not be needed.

The body is readily made by molding, which assures uniformly identical and repetitive devices at a low cost. When the central part is formed in one piece, there is a reduced risk of leakage. This valve will not plug up, even if crystals are present, such as crystals which might remain after evaporation in the valve of a saline solution.

Accordingly, there is shown an elegantly simple, very reliable flow control valve.

This invention is not to be limited to the embodiment shown in the drawings and described in the description, which is given by way of example and not of limitation, but only in accordance with the scope of the appended claims.

I claim:

1. A valve having a central axis, said valve comprising a body having a first face and a second face, an axially extending passage extending from face to face, a first seat on said first face surrounding one end of said passage, a second seat on said second face surrounding the other end of said passage, said seats being axially spaced apart by a reference spacing:
    a first port through said body opening on said first face outside of said first seat, a second port through said body opening on said second face outside of said second seat, and a third port through said body opening into said passage;
    a first nominally planar flexible and elastic diaphragm supported by said body adjacent said first seat, and a second nominally planar flexible and elastic diaphragm supported by said body adjacent to said second seat, said diaphragms each having a sealing surface which when the diaphragm is relaxed is spaced from its respective seat, said sealing surfaces being axially spaced apart at that time by an axial control spacing, said control spacing being larger than said reference spacing;
    said diaphragms and said body forming flow channels from said first and second faces to said first and second ports when the respective diaphragm is displaced from its respective seat;
    a push rod in said central passage, said push rod having an axial length at least equal to said control spacing so as to remain in abutting non-adherent contact with both of said diaphragms, not secured in any way to either of said diaphragms, and having a lesser cross section configuration than said passage so as to permit fluid flow past the push rod between the ports;
    force bias means mounted to said body adapted to maintain a continuing force on said first diaphragm tending to move said diaphragm against said pushrod; and
    an axial plunger means so disposed and arranged so as to apply an axial force to move said second diaphragm against the push rod, and through the push rod against the first diaphragm to move said diaphragms and said push rod in opposition to said bias means, when pressed toward said second diaphragm;
    whereby the flow condition of the valve is changed as a function of pressing on or not pressing on said plunger.

2. A valve according to claim 1 in which said force bias means comprises a plug threaded into said body, a plunger in said plug disposed and arranged to move toward said first diaphragm, and a bias spring exerting a force against the plunger for that purpose.

3. A valve according to claim 2 in which said plug is threadedly attached to said body to enable its axial adjustment.

4. A valve according to claim 3 in which after adjustment said plug is rigidly fixed to said body.

5. A valve according to claim 1 in which an actuator means is attached to said body and arranged so as selectively to force said plunger means toward said second diaphragm, and through it against said push rod and through it against said first diaphragm whereby to move said diaphragms and said push rod in opposition to said bias means.

6. A valve according to claim 5 in which said actuator means is a solenoid.

7. A valve according to claim 6 in which said force bias means comprises a plug threaded into said body, a plunger in said plug disposed and arranged to move toward said first diaphragm, and a bias spring exerting a force against the plunger for that purpose.

8. A valve according to claim 7 in which said plug is threadedly attached to said body to enable its axial adjustment.

9. A valve according to claim 8 in which after adjustment said plug is rigidly fixed to said body.

* * * * *